US006986252B2

(12) United States Patent
Hedman

(10) Patent No.: US 6,986,252 B2
(45) Date of Patent: Jan. 17, 2006

(54) INTERNAL COMBUSTION ENGINE WITH STEAM EXPANSION STROKE

(75) Inventor: Mats Hedman, Sparreholm (SE)

(73) Assignee: Cargine Engineering AB, Helsingborg (SE)

( * ) Notice: Subject to any disclaimer, the term of this patent is extended or adjusted under 35 U.S.C. 154(b) by 0 days.

(21) Appl. No.: 10/491,661

(22) PCT Filed: Oct. 1, 2002

(86) PCT No.: PCT/SE02/01777

§ 371 (c)(1),
(2), (4) Date: Oct. 6, 2004

(87) PCT Pub. No.: WO03/029627

PCT Pub. Date: Apr. 10, 2003

(65) Prior Publication Data

US 2005/0034456 A1    Feb. 17, 2005

(30) Foreign Application Priority Data

Oct. 4, 2001    (SE) .................................. 0103303

(51) Int. Cl.
*F01B 29/04*    (2006.01)
(52) U.S. Cl. ..................... 60/712; 123/25 C; 123/25 J; 123/25 K
(58) Field of Classification Search .................. 60/712; 123/25 C, 25 J, 25 K, 25 P
See application file for complete search history.

(56) References Cited

U.S. PATENT DOCUMENTS

| 2,671,311 A | * | 3/1954 | Hans ........................ 123/25 R |
| 3,964,263 A | | 6/1976 | Tibbs |
| 3,986,575 A | * | 10/1976 | Eggmann .................... 180/302 |
| 4,322,950 A | * | 4/1982 | Jepsen ........................ 60/712 |
| 4,402,182 A | | 9/1983 | Miller |
| 4,552,106 A | | 11/1985 | Spence |
| 5,896,746 A | * | 4/1999 | Platell ........................ 60/618 |

FOREIGN PATENT DOCUMENTS

| DE | 36 13270 | 8/1986 |
| DE | 35 33592 | 4/1987 |

* cited by examiner

*Primary Examiner*—Hoang Nguyen
(74) *Attorney, Agent, or Firm*—Young & Thompson

(57) ABSTRACT

A method for controlling an internal combustion engine, and an internal combustion engine, having at least one cylinder (1), a reciprocating piston (16) arranged in the cylinder (1), a combustion chamber (15) delimited by the cylinder (1) and the piston (16), and inlet and outlet valves (2, 3) that are controlled by a computer-based control system (5). The combustion engine includes elements (10) for injecting water or water steam into the combustion chamber (15), and the control system (5) is arranged to control the inlet and outlet valves (2, 3) and the elements (10) for injection of water or water steam such that power strokes that are mainly based on expanding combustion gases are alternated with power strokes that are mainly based on expanding water steam.

14 Claims, 1 Drawing Sheet

INTERNAL COMBUSTION ENGINE WITH STEAM EXPANSION STROKE

FIELD OF THE INVENTION

The present invention relates to a method for internal combustion engines with controllable valves, by which heat that, in engines of today, is lost through cylinder cooling and via exhaust gases is transformed into work.

The invention also relates to a combustion engine comprising at least one cylinder, a reciprocating piston that is arranged in the cylinder, a combustion chamber that is delimited by the cylinder and the piston, and inlet and outlet valves that are controlled by a computer-based control system. Preferably, the control system is a control system based on a computer program and may be electrical or optical.

The invention is also applicable to internal combustion engines regardless of type of combustion cycle. Otto-, Diesel-, Wankel-, HCCI and Free-piston engines are examples by which the invention is useful. However, the engines must be provided with controllable valves and equipment for injection of water and/or water steam in order to permit its implementation.

The invention requires a control system that, for example, is provided as a part of the control system that is used for controlling the controllable valves and fuel injection, etc.

THE BACKGROUND OF THE INVENTION

During resent years, internal combustion engines for, for example, vehicles have been designed towards an improved operational economy and a reduced effect on the environment by means of introduction of digital control systems for optimization in different operation situations. This is, for example, the case for fuel injection, ignition, variable compression and controllable valves. As to the methods for transforming the heat that is lost via cylinder cooling and exhaust gases into work, there has not been any remarkable improvement.

Different variants of water injection into internal combustion engines have been tested. On one hand, the intention has been to decrease the combustion temperature in order to reduce the generation of nitrogen oxides, on the other hand the intention has been to decrease the cooling losses in order to obtain a high degree of executed work. Furthermore, there have been attempts to inject high pressure water steam in connection to the combustion. The high pressure steam has been generated by evaporation of water by means of hot exhaust gases. The attempts have shown that the generation of nitrogen oxides decreases upon use of water/water steam. Furthermore, an improved efficiency has been proven. A problem that has restricted said attempts is that, during injection of water/water steam, large amount of energy is consumed, as the injection takes place in connection to the end of a compression stroke and/or during combustion, when the cylinder pressure is high. Another problem with a restricting effect is that the presence of a substantial amount of water, with an important cooling effect during the evaporation, has effected the combustion, resulting in an unwanted increased of non-combusted hydrocarbons. The positive effects has not compensated for said drawbacks.

The present invention eliminates said problems, and heat that is normally lost via cylinder cooling and via exhaust gases is, to a remarkable degree, transformed into work.

THE OBJECT OF THE INVENTION

The object of the present invention is to avoid said problems and to, in a re-markable degree, transform heat that, in today's engines, is lost via cylinder cooling and exhaust gases into work.

SUMMARY OF THE INVENTION

The object of the invention is achieved by means of a method for controlling internal combustion engines, by which power strokes that are mainly based on expanding combustion gases are alternated with power strokes that are mainly based on expanding water steam, for the purpose of transforming into work the heat that upon combustion is generated in the cylinder and in the exhaust gases, water and/or water steam being supplied to a combustion chamber in connection to the end of an evacuation stroke, characterised in that the engine comprises controllable valves, the control of which is based on an electronic control system, which is based on a computer program, and that inlet valves to the combustion chamber are closed as an answer to the control system delivering a signal that indicates that water/water steam is to be supplied to the combustion chamber.

The object of the invention is also achieved by means of a combustion engine, comprising at least one cylinder, a reciprocating piston that is arranged in the cylinder, a combustion chamber that is delimited by the cylinder and the piston, and an electronic control system, and means for injecting water or water steam into the combustion chamber, said control system being arranged to control the means for injecting water or water steam, such that power strokes that are mainly based on expanding combustion gases are alternated with power strokes that are mainly based on expanding water steam, water and/or water steam being supplied to the combustion chamber in connection to the end of an evacuation stroke, characterised in that it comprises inlet and outlet valves that are controlled by the electronic control system, and that the inlet valves to the combustion chamber are arranged to close as a response to a signal from the control system telling that water/water steam is to be supplied to the combustion chamber.

Furthermore the invention relates to a computer program product, stored on a readable computer program medium, for the implementation of the method according to the invention onto a combustion engine according to the invention.

Power strokes that are mainly based on expanding water steam are characherised in that water and/or water steam is supplied to the combustion chamber in connection to the end of the evacuation stroke and when the piston reaches its upper dead point.

Further features of the invention are presented in the following description and the patent claims.

Controllable valves are referred to as valves to the combustion chamber of an engine cylinder, said valves being able to open and close, for example by the action of a pressure fluid, based on signals from, preferably, electronic control system that is based on a computer program.

Here, power stroke is referred to as when the energy in an expanding mass of gas is transformed into mechanical work. According to the invention, the mass of gas is either mainly constituted by combustion gases or mainly constituted by water steam.

Evacuation stroke is referred to as when, for example, a piston, after a power stroke, during its movement from the lower dead point towards the upper dead point forces the mass of gas that expanded during the power stroke out through the outlet valves.

The reason why controllable valves are a necessary requirement is that power strokes that are mainly based on expanding combusting gases are to be alternated with power strokes that are mainly based on expansion of water steam. The power strokes based on expanding combusting gases will here and after be referred to as combustion strokes and the power strokes based on expanding water steam will here and after be referred to as steam expansion strokes. In contemporary piston combustion engines, exemplified in the present description, the inlet valves open and outlet valves close in connection to the end of the evacuation stroke. When the control system transmits a signal ordering the supply of water and/or water steam to the combustion chamber for the execution of a steam expansion stroke, the inlet valves for regular supply of air shall not be open, but instead be kept closed, after the end of the evacuation stroke. Accordingly, when water and/or water steam is supplied, the outlet valves as well as the inlet valves are closed, and cylinder pressure is low. When water is supplied, it is intended to be evaporated by the heat that is present via the piston tip and the further hot surfaces of the combustion chamber. During the evaporation, the hot surfaces are cooled while, simultaneously, a steam pressure is generated in connection to the start of a steam expansion stroke. When water steam is supplied, it has been generated by an evaporation of water by means of the heat present in the exhaust gases. During the supply, the water steam is pressurized. After supply of water as well as supply of water steam, water steam will expand and execute work as the piston moves towards its lower dead point. At the lower dead point of the piston, the outlet valves are opened upon a signal from the control system, and the evacuation stroke for water steam begins. When the control system transmits a signal telling that a combustion stroke is to be executed, the inlet valves are controlled in order to open as usual at the end of the evacuation stroke.

Here, a steam expansion stroke is referred to as a power stroke in a two-stroke-cycle without any combustion, in which water and/or water steam is supplied in connection to the upper dead point of the piston and the end of an evacuation stroke. The supply is effected by the opening of injection valves, suitable for this purpose, for injection generally simultaneously with or after the closure of the outlet valves. At this stage, the cylinder pressure is relatively low, which is a remarkable advantage in comparison to the attempts that have been discussed above in the introductory part of the description. The water is supplied in order to, via an evaporation, cool the surfaces that are heated by the combustion gases and that delimit the combustion chamber, and in order to, simultaneously, generate high pressure water steam. High pressure water steam is also generated by evaporation of water by means of heat from exhaust gases, that would otherwise go out into the atmosphere. Water steam or water may be supplied at separate occasions, as has been described above, but also during the same power stroke. This means that only water may be supplied before and/or during the power stroke or that only water steam may be supplied before and/or during the power stroke, or that both water and water steam may be supplied before and/or during the power stroke. By the expanding water steam, the indicated work is generated as the piston moves towards its lower dead point. By an alternation of steam expansion strokes and combustion strokes a remarkable improvement of the efficiency is obtained. An engine may be totally cooled by means of steam expansion strokes based on the injection of water into the combustion chamber, that are alternated with combustion strokes to a suitable degree. The control system decides to which degree steam expansions strokes that are based on injection of water are to be performed.

The part of the losses of an Otto engine that are due to cylinder cooling are approximately 30%, and an approximately equal part is lost via the exhaust gases. For diesel engines, the losses are less, but still so high that the invention will result in a remarkably improved efficiency. Also the other types of internal combustion engines have heat losses of a corresponding degree.

Accordingly, the cylinders of an engine may be isolated outwardly in order to obtain a larger need of internal cooling by means of injection of water into the combustion chamber as described here. The more efficient the isolation is, the more heat will be accessible for water evaporation on the surfaces that delimit the combustion chamber. However, the possibility of getting the maximum effect out of the engine is somewhat delimited by this method. However, also the use of a cooling system of traditional type will, in combination with the invention, result in remarkable advantages as to the efficiency.

The exhaust gas system of an engine may, advantageously, be isolated out-wardly in order to obtain an increased capacity for the production of pressurized water steam. The more efficient the isolation is, the more exhaust gas heat will be accessible for water evaporation. By mobile implementations of the invention, it is a great advantage if the water in the exhaust gases is recycled. Then, there are large quantities of water that are to be evaporated in a heat exchanger in the exhaust gas system. This water will be contaminated by, for example, soot and other particles. The water, which defines a remarkably effective particle trap, is filtered before being used for steam generation or being injected into the combustion chamber. After evaporation of water, the exhaust gases are remarkably clean and may, advantageously, be recycled into a suitable degree, so called EGR.

As has been mentioned, water injection in connection to combustion is well known. In the present invention, water and/or pressurized water steam is supplied without any connection to the combustion. Accordingly the combustion is not effected by large quantities of supplied water, as in the described attempts, which is a remarkable advantage in the efforts of avoiding non-combusted hydro carbons. In a multi cylinder engine, a power stroke based on expanding combustion gases may take place in one cylinder while, simultaneously, a power stroke based on expanding water steam takes place in an other cylinder.

During the injection of water, it is desirable that the water begin to evaporate as soon as possible in order to obtain a largest possible steam pressure at the beginning of the power stroke. In order to decrease the time for starting the evaporation, the temperature of the water may be adapted already when the water is supplied, such that an evaporation is initiated immediately without any further substantial heating of water being needed. During the evaporation, the cylinder pressure increases due to the steam generation, and the temperature that is required for a continuous evaporation also increases. The evaporation takes place as heat is absorbed from the surfaces that surround the combustion chamber. This heat has been accumulated in the material that defines said surfaces, during the preceding combustion cycles. At a certain pressure level, accumulated heat has been transformed into water steam into such an extent that, if there would be further water, the evaporation would stop.

The amount of supplied water should be adapted such that a sufficient cooling is achieved without any liquid being accumulated in the engine.

Water steam, generated by exhaust gas heat, may have a relatively high pressure and high temperature. For example, the pressure- and temperature levels may be 100 to 150 bar and 300 to 350 degrees Celsius. At these levels, the contribution to the work of the engine becomes remarkably high. During operation the control system will, amongst others, monitor the need of engine work and the need of cooling and the accessible quantities of high pressure water steam and water. The control system guaranties that combustion strokes are alternated with the necessary steam expansion strokes that are based on the injection of water in the combustion chambers in order to obtain a sufficient cooling of pistons and cylinders. Furthermore, the control system guaranties that steam expansion strokes that are based on pressurized water steam obtained by means of exhaust gas heat is used at suitable occasions.

The device according to the invention comprises one or more sensors for measuring the cylinder temperature, and, based on this information from these sensors, the control system decides when a steam expansion stroke based on the supply of water to the combustion chamber is to be performed, and which amount of water that is to be supplied, and then the ordering of water injection is performed by means of control signals. By means of sensors for sensing the pressure of pressurized water steam, the control system determines when and in which amount pressurized water steam shall be supplied to the combustion chamber and orders the injection of water steam by means of a control signal. Advantageously, the pressurized water steam is supplied when the pressure thereof has reached such a level that the work performed during the steam expansion stroke will be generally the same as during all further power strokes, such that, for example, a driver of a vehicle will not recognize any variation in the operation of the engine. The control system optimises the alternation between combustion strokes and the described steam expansion strokes.

A steam expansion stroke may also be performed after a mixture of the two methods mentioned above. This is not a deviation from the invention. Furthermore, it is not a deviation from the invention to let water be evaporated on surfaces that outwardly surrounds the combustion chamber, or to do this in combination with the method described above.

DESCRIPTION OF THE DRAWINGS

Hereinafter, a preferred embodiment of the invention will be described with reference to the drawing, on which.

DESCRIPTION OF AN EMBODIMENT

Figure 1:
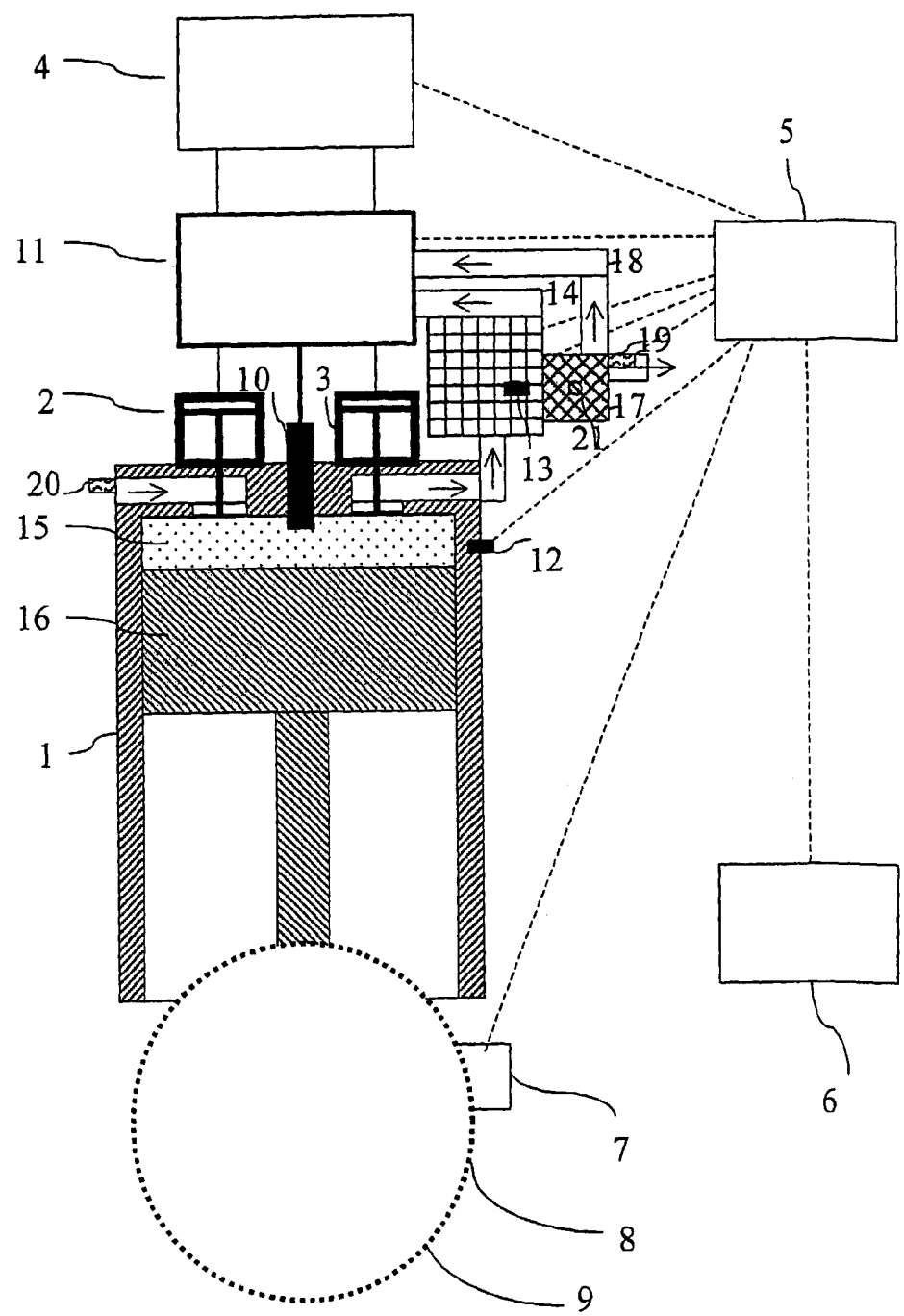
FIG. 1 is a schematic cross section of the part of a combustion engine according to the invention.

FIG. 1 is an exemplifying, schematic picture of a device according to the invention, showing a cylinder 1 with a piston 16. The device comprises an inlet valve 2 and an outlet valve 3 that are constituted by controllable valves, both of which, for the moment, are closed after an evacuation stroke that has just been ended. The piston 16 has reached its upper dead point. Water has been supplied to the combustion chamber 15 by means of the injection valve 10, in order to cool the surfaces that surround the combustion chamber 15, and an evaporation and pressure increase is taking place before a steam expansion stroke. A circuit 4 is used for the activation of the valves 2 and 3. A control unit 5 is operatively connected with the circuit 4 for signal-control of the circuit and the valves 2 and 3 that are connected with the circuit. A member 6, for example a gas pedal, is operatively connected with the control unit 5 for the purpose of torque commanding. A gauge 7, provided on a graduated arc 9 that is mounted on the engine shaft 8, and operatively connected with the control unit 5, repeatedly provides information to the control unit 5 about rotation speed of the engine, and about the position of the piston 16 in the cylinder 1. The control unit 5 decides when the controllable valves 2 and 3 are to be opened and closed. A pressure fluid circuit 11, operatively connected with the control unit 5, is used for purpose of activating a means, defined by an injection valve 10, for supply of water or water steam to the combustion chamber 15. A returning member 14 is used for returning water steam, for injection by means of the injection valve 10. In a steam generator, connected with the exhaust gas system and with pressure gauges 13 and operatively connected with the control unit 5, there is an evaporation of water that, via the returning member 14, upon a signal from the control unit 5 to the circuit 11, which in its turn activates the injection valve 10, is supplied to the combustion chamber 15. A temperature gauge 12, which is operatively connected with the control unit 5, provides the control unit 5 with information about the present cylinder temperature. The control unit 5 uses this information about the cylinder temperature for the purpose of determining when the circuit 4 shall be commanded to close the valves 2 and 3, and when the circuit 11 shall be commanded to activate the injection valve 10 for the injection of water into the combustion chamber 15. All water and all water steam that is used is mixed with exhaust gases and is supplied to the exhaust gas system. In a heat exchanger 17, operatively connected with control unit 5, downstream the steam generator in the exhaust gas system, the amount of water that is needed is recycled by means of condensation, i.e. air-cooling of the exhaust gases. This water, the condensate, is purified in a particle filter 21, which is positioned in the heat exchanger 17, before being used. On one hand this treatment is relevant for water that is used for cooling the surfaces that surrounds the combustion chamber interiorly, and on the other hand for water that is to be transformed to water steam by means of exhaust gas heat. Water that is to be injected into the combustion chamber is transported via the returning member 18 to the circuit 11. From the heat exchanger 17 water is transported to the steam generator, which is provided with pressure gauges 13. The inlet valve 10 may be subdivided into two separate valves, one for water and one for water steam. In an Otto engine, the injection valve may also be attached to ignition plugs and/or the fuel injection valve. In a diesel engine, it may be attached to the fuel injection valve. Via a gathering member 19, operatively connected with the control unit 5, exhaust gases are gathered in order to be supplied to the engine in a suitable amount by means of the returning member 20. This is normally referred to as EGR. The connection between the gathering member 9 and the returning member 20, and the operative connection with the control unit 5 are not shown in this drawing.

It should be realised that a plurality of variants of the embodiment of the device and the method according to the invention that has been described above will be obvious for a man skilled in the art without thereby deviating from the scope of the invention, such as the latter is defined in the annexed claims, supported by the description and the annexed drawings.

It should also be emphasized that the device according to the invention, suitably, but not necessary, comprises all the components that have been indicated in the description of the preferred embodiment.

What is claimed is:

1. A method for controlling internal combustion engines, by which power strokes that are mainly based on expanding combustion gases are alternated with power strokes that are mainly based on expanding water steam, for the purpose of transforming into work the heat that upon combustion is generated in the cylinder and in the exhaust gases, water and/or water steam being supplied to a combustion chamber (15) in connection to the end of an evacuation stroke, characterised in that the engine comprises controllable valves (2,3), the control of which is based on an electronic control system, which is based on a computer program, and that inlet valves to the combustion chamber are closed as an answer to the control system delivering a signal that indicates that water/water steam is to be supplied to the combustion chamber (15).

2. A method according to claim 1, characterised in that a supply of water cools the top of a reciprocating piston (16) in a cylinder (1) as well as hot surfaces that delimit the combustion chamber (15), the water being evaporated as it gets into contact with the hot surfaces.

3. A method according to claim 1, characterised in that supplied water steam is generated by evaporation of water by means of exhaust gas heat.

4. A method according to claim 3, characterised in that the temperature of water that is supplied to the combustion chamber (15) is adapted for the purpose of obtaining an immediate evaporation as it is introduced into the combustion chamber or as it gets in contact with heat surfaces in the latter.

5. A method according to claim 1, characterised in that an exhaust gas system connected to the engine is insulated for the purpose of decreasing exterior cooling of the exhaust gases therein by the environment.

6. A method according to claim 1, characterised in that the cylinder or cylinders (1) of the engine is/are insulated in order to decrease exterior cooling of said cylinder or cylinders (1).

7. A method according to claim 1, characterised in that water that is supplied to the combustion chamber (15) or that is used for the generation of water steam is filtered in respect of particles after having been condensed from water steam in an exhaust gas system connected to the engine.

8. A method according to claim 1, characterised in that it is implemented by means of a control system (5) that comprises a computer program, which is arranged for the purpose of optimal alternation of combustion strokes and steam expansion strokes.

9. A method according to claim 1, characterised in that some of the steam expansion strokes are selected to mainly include a supply of water into the combustion chamber (15), and that the remaining steam expansion strokes are selected to mainly comprise a supply of water steam into the combustion chamber (15).

10. A method according to claim 1, characterised in that the supply of water or water steam is executed in connection to the end of an evacuation stroke.

11. A method according to claim 9, characterised in that the execution of steam expansion strokes that mainly comprise supply of water is based on the cylinder wall temperature, and so often that an over-heating of the cylinder or cylinders (1) of the engine is avoided.

12. A method according to claim 11, characterised in that the supply of water steam is executed when the steam pressure is so high that the work performed during the steam expansion stroke is mainly equal to the one of the other power strokes.

13. A combustion engine, comprising at least one cylinder (1), a reciprocating piston (16) that is arranged in the cylinder (1), a combustion chamber that is delimited by the cylinder (1) and the piston (16), and an electronic control system (5), and means (10) for injecting water or water steam into the combustion chamber (15), said control system (5) being arranged to control the means (10) for injecting water or water steam, such that power strokes that are mainly based on expanding combustion gases are alternated with power strokes that are mainly based on expanding water steam, water and/or water steam being supplied to the combustion chamber (15) in connection to the end of an evacuation stroke, characterised in that it comprises inlet and outlet valves (2, 3) that are controlled by the electronic control system (5), and that the inlet valves (2) to the combustion chamber (15) are arranged to close as a response to a signal from the control system (5) ordering water/water steam to be supplied to the combustion chamber (15).

14. A computer program product, stored on a readable computer program medium, for implementation of the method according to claim 1.

* * * * *